(12) United States Patent
Baker et al.

(10) Patent No.: US 9,317,531 B2
(45) Date of Patent: Apr. 19, 2016

(54) AUTOCAPTIONING OF IMAGES

(71) Applicant: Microsoft Corporation, Redmond, WA (US)

(72) Inventors: Simon Baker, Palo Alto, CA (US); Krishnan Ramnath, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 13/654,419

(22) Filed: Oct. 18, 2012

(65) Prior Publication Data

US 2014/0114643 A1 Apr. 24, 2014

(51) Int. Cl.
*G10L 13/00* (2006.01)
*G10L 21/00* (2013.01)
*G06K 9/74* (2006.01)
*G06F 17/30* (2006.01)
*G06T 7/00* (2006.01)

(52) U.S. Cl.
CPC .... *G06F 17/30265* (2013.01); *G06F 17/30817* (2013.01); *G06T 7/004* (2013.01)

(58) Field of Classification Search
CPC ....................................................... G06T 7/004
See application file for complete search history.

(56) References Cited

U.S. PATENT DOCUMENTS

| | | | |
|---|---|---|---|
| 6,661,918 B1 * | 12/2003 | Gordon et al. ................. 382/173 |
| 6,735,583 B1 * | 5/2004 | Bjarnestam et al. | |
| 6,804,652 B1 | 10/2004 | Shaffer | |
| 7,028,253 B1 * | 4/2006 | Lieberman ........ G06F 17/30265 345/625 |
| 7,788,262 B1 * | 8/2010 | Shirwadkar .................... 707/737 |
| 7,900,225 B2 * | 3/2011 | Lyon .................. G06Q 30/0251 725/109 |
| 8,396,287 B2 * | 3/2013 | Adam ............... G06F 17/30244 382/103 |
| 8,411,960 B2 * | 4/2013 | Misawa et al. ................ 382/190 |
| 8,477,994 B1 * | 7/2013 | Noshadi ........................ 382/103 |
| 8,655,889 B2 * | 2/2014 | Hua et al. ....................... 707/748 |
| 8,712,157 B2 * | 4/2014 | Marchesotti et al. ......... 382/190 |
| 8,743,205 B2 * | 6/2014 | Yehezkel .......... G08B 13/19693 348/159 |
| 8,886,576 B1 * | 11/2014 | Sanketi et al. ................... 706/12 |
| 8,935,259 B2 * | 1/2015 | Kennberg ............. H04L 63/101 382/118 |
| 2002/0188602 A1 * | 12/2002 | Stubler et al. ...................... 707/3 |
| 2005/0105776 A1 * | 5/2005 | Luo et al. ....................... 382/115 |
| 2006/0100883 A1 | 5/2006 | Miyamoto et al. | |
| 2006/0227240 A1 | 10/2006 | Chiu et al. | |
| 2006/0262134 A1 * | 11/2006 | Hamiter et al. ................ 345/619 |
| 2007/0005529 A1 | 1/2007 | Naphade et al. | |

(Continued)

FOREIGN PATENT DOCUMENTS

EP 2096857 A1 9/2009

OTHER PUBLICATIONS

Aker, Ahmet, and Robert J. Gaizauskas. "Model Summaries for Location-related Images." LREC. 2010.*

(Continued)

*Primary Examiner* — Brian Albertalli
(74) *Attorney, Agent, or Firm* — Sandy Swain; Micky Minhas

(57) ABSTRACT

The description relates to sentence autocaptioning of images. One example can include a set of information modules and a set of sentence generation modules. The set of information modules can include individual information modules configured to operate on an image or metadata associated with the image to produce image information. The set of sentence generation modules can include individual sentence generation modules configured to operate on the image information to produce a sentence caption for the image.

20 Claims, 9 Drawing Sheets

(56) References Cited

U.S. PATENT DOCUMENTS

| | | | |
|---|---|---|---|
| 2007/0011012 A1* | 1/2007 | Yurick et al. | 704/277 |
| 2008/0195657 A1* | 8/2008 | Naaman | G06K 9/00677 |
| 2009/0076797 A1* | 3/2009 | Yu | 704/9 |
| 2010/0226582 A1* | 9/2010 | Luo et al. | 382/224 |
| 2011/0157303 A1 | 6/2011 | Broberg | |
| 2012/0023103 A1* | 1/2012 | Soderberg et al. | 707/739 |
| 2012/0062766 A1* | 3/2012 | Park | H04N 1/00307 |
| | | | 348/231.5 |
| 2012/0233150 A1* | 9/2012 | Naim et al. | 707/722 |
| 2012/0233531 A1* | 9/2012 | Ma et al. | 715/205 |
| 2013/0202198 A1* | 8/2013 | Adam et al. | 382/159 |
| 2013/0249783 A1* | 9/2013 | Sonntag | 345/156 |
| 2013/0262588 A1* | 10/2013 | Barak et al. | 709/204 |
| 2013/0265450 A1* | 10/2013 | Barnes, Jr. | 348/207.1 |
| 2014/0126821 A1* | 5/2014 | Criminisi et al. | 382/173 |
| 2014/0198234 A1* | 7/2014 | Kobayashi et al. | 348/231.99 |

OTHER PUBLICATIONS

Farhadi, Ali, et al. "Every picture tells a story: Generating sentences from images." Computer Vision—ECCV 2010. Springer Berlin Heidelberg, 2010. 15-29.*

Li, Siming, et al. "Composing simple image descriptions using web-scale n-grams." Proceedings of the Fifteenth Conference on Computational Natural Language Learning. Association for Computational Linguistics, 2011.*

Eichner, Marcin, and Vittorio Ferrari. "We are family: Joint pose estimation of multiple persons." Computer Vision-ECCV 2010. Springer Berlin Heidelberg, 2010. 228-242.*

Yang, Yi, et al. "Recognizing proxemics in personal photos." Computer Vision and Pattern Recognition (CVPR), 2012 IEEE Conference on. IEEE, 2012.*

Yao, Bangpeng, and Li Fei-Fei. "Modeling mutual context of object and human pose in human-object interaction activities." Computer Vision and Pattern Recognition (CVPR), 2010 IEEE Conference on. IEEE, 2010.*

Gupta, Abhinav, Aniruddha Kembhavi, and Larry S. Davis. "Observing human-object interactions: Using spatial and functional compatibility for recognition." Pattern Analysis and Machine Intelligence, IEEE Transactions on 31.10 (2009): 1775-1789.*

Desai, Chaitanya, and Deva Ramanan. "Detecting actions, poses, and objects with relational phraselets." Computer Vision—ECCV 2012. Springer Berlin Heidelberg, 2012. 158-172.*

Gupta, Abhinav, and Larry S. Davis. "Beyond nouns: Exploiting prepositions and comparative adjectives for learning visual classifiers." Computer Vision—ECCV 2008. Springer Berlin Heidelberg, 2008. 16-29.*

Li, Congcong, Devi Parikh, and Tsuhan Chen. "Automatic discovery of groups of objects for scene understanding." Computer Vision and Pattern Recognition (CVPR), 2012 IEEE Conference on. IEEE, 2012.*

Yao, Bangpeng, and Li Fei-Fei. "Recognizing human-object interactions in still images by modeling the mutual context of objects and human poses." Pattern Analysis and Machine Intelligence, IEEE Transactions on 34.9 (2012): 1691-1703.*

Sadeghi, Mohammad Amin, and Ali Farhadi. "Recognition using visual phrases." Computer Vision and Pattern Recognition (CVPR), 2011 IEEE Conference on. IEEE, 2011.*

Maji, Subhransu, Lubomir Bourdev, and Jitendra Malik. "Action recognition from a distributed representation of pose and appearance." Computer Vision and Pattern Recognition (CVPR), 2011 IEEE Conference on. IEEE, 2011.*

Prest, Alessandro, Cordelia Schmid, and Vittorio Ferrari. "Weakly supervised learning of interactions between humans and objects." Pattern Analysis and Machine Intelligence, IEEE Transactions on 34.3 (2012): 601-614.*

Desai, Chaitanya, Deva Ramanan, and Charless Fowlkes. "Discriminative models for static human-object interactions." Computer vision and pattern recognition workshops (CVPRW), 2010 IEEE computer society conference on. IEEE, 2010.*

Torralba, Antonio, Bryan C. Russell, and Jenny Yuen. "Labelme: Online image annotation and applications." Proceedings of the IEEE 98.8 (2010): 1467-1484.*

Ordonez, Vicente, Girish Kulkarni, and Tamara L. Berg. "Im2text: Describing images using 1 million captioned photographs." Advances in Neural Information Processing Systems. 2011.*

Delaitre, Vincent, Josef Sivic, and Ivan Laptev. "Learning person-object interactions for action recognition in still images." Advances in neural information processing systems. 2011.*

Ushiku, et al., "Automatic Sentence Generation from Images", Retrieved at <<http://www.isi.imi.i.u-tokyo.ac.jp/publication/2011/ACMMM2011_ushiku.pdf>>, Proceedings of the 19th ACM international conference on Multimedia, Nov. 28, 2011, pp. 1533-1536.

Bitvai Zsolt, "Photo Captioner", Retrieved at <<http://www.dcs.shef.ac.uk/intranet/teaching/projects/archive/I31011/pdf/ZBitvai_PhotoCaptioner.pdf>>, May 4, 2011, pp. 1-66.

Feng, et al., "How ManyWords is a Picture Worth? Automatic Caption Generation for News Images" Retrieved at <<http://www.aclweb.org/anthology/P/P10/P10-1126.pdf>>, Proceedings of the 48th Annual Meeting of the Association for Computational Linguistics, Jul. 11, 2010, pp. 1239-1249.

Fan, et al., "Automatic Image Captioning from the Web for GPS Photographs" Retrieved at <<http://staffwww.dcs.shef.ac.uk/people/A.Aker/mirPaper.pdf>>, In the Proceedings of the international conference on Multimedia information retrieval, Mar. 29, 2010, pp. 445-448.

Richardson, Matt, "Descriptive Camera, 2012", Retrieved at <<http://mattrichardson.com/Descriptive-Camera/>>, Retrieved Date : Jun. 19, 2012, pp. 6.

Feng Yansong, "Automatic Caption Generation for News Images", Retrieved at <<http://www.era.lib.ed.ac.uk/bitstream/1842/5291/1/Feng2011.pdf>>, Retrieved Date : Jun. 19, 2012, pp. 1-155.

Pan, et al., "Automatic Image Captioning", Retrieved at <<http://www.informedia.cs.cmu.edu/documents/icme04autoicap.pdf>>, In the proceedings of the 2004 IEEE International Conference on Multimedia and Expo (ICME'04), Jun. 27, 2004, pp. 1987-1990.

"International Search Report & Written Opinion for PCT Patent Application No. PCT/US2013/065716", Mailed Date: Dec. 10, 2013, Filed Date: Oct. 18, 2013, 9 Pages.

Yao, et al.,"I2T: Image Parsing to Text Description", In Proceedings of the IEEE,vol. 98, Issue 8, Aug. 2010 24 Pages.

Kulkarni, et al.,"Baby Talk: Understanding and Generating Simple Image Description", In IEEE Conference on Computer Vision and Pattern Recognition (CVPR), Jun. 20, 2011, 8 Pages.

Lindstaedt, et al.,"Recommending Tags for Pictures Based on Text, Visual Content and User Context", In the Third International Conference on Internet and Web Applications and Services ICIW, Jun. 8, 2008, 6 Pages.

Hede, et al.,"Automatic Generation of Natural Language Description for Images", In Proceeding of Computer-Assisted Information Retrieval (Recherche d'Information et ses Applications)—RIAO 2004, 7th International Conference, Apr. 26, 2004, 8 Pages.

International Preliminary Report on Patentability and Written Opinion mailed Apr. 30, 2015 from PCT Patent Application No. PCT/US2013/065716, 6 Pages.

* cited by examiner

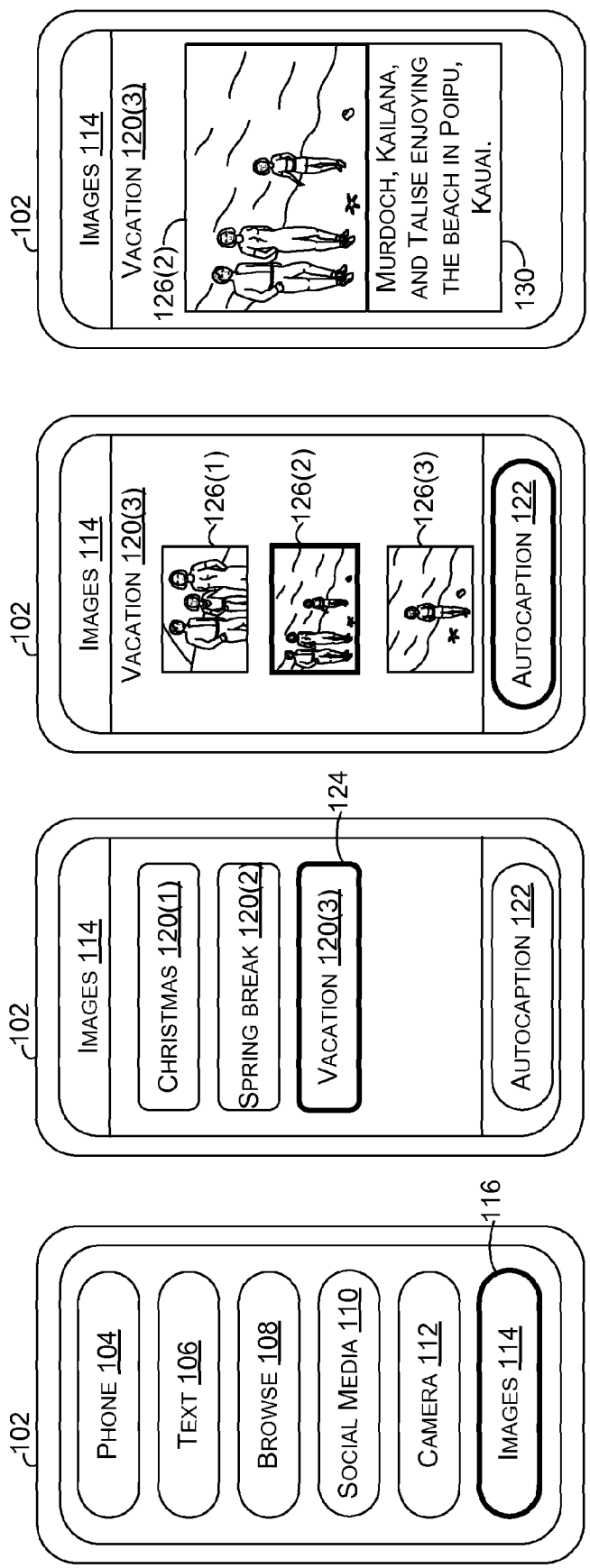

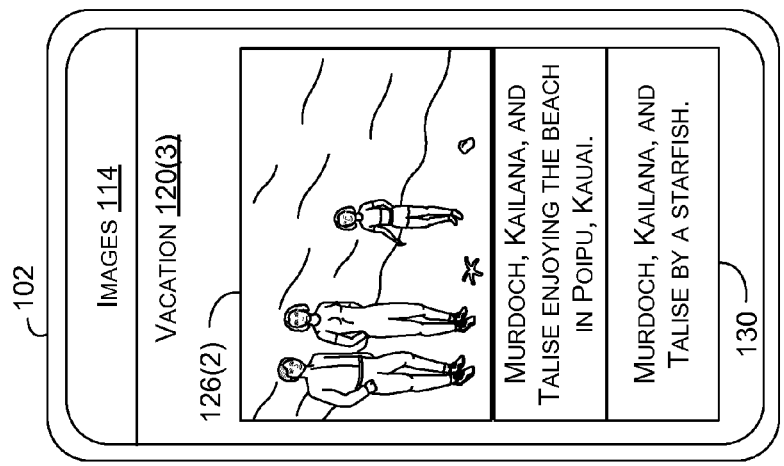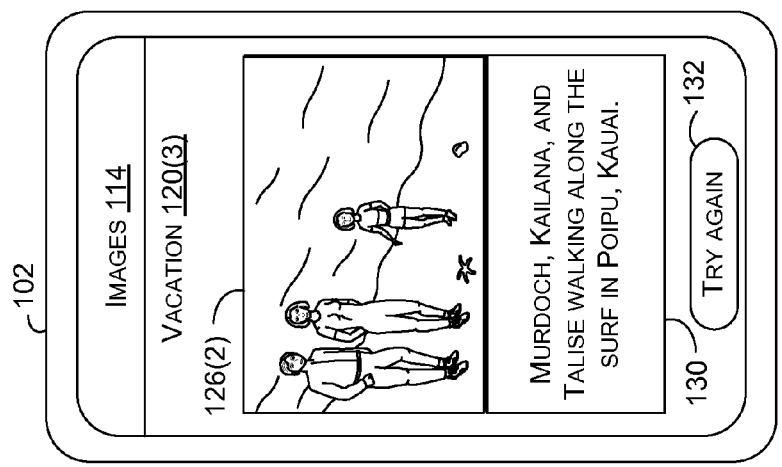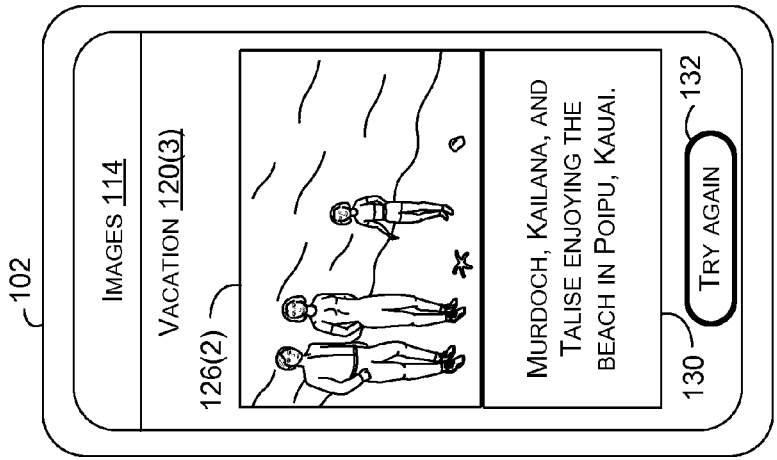
FIG. 1B

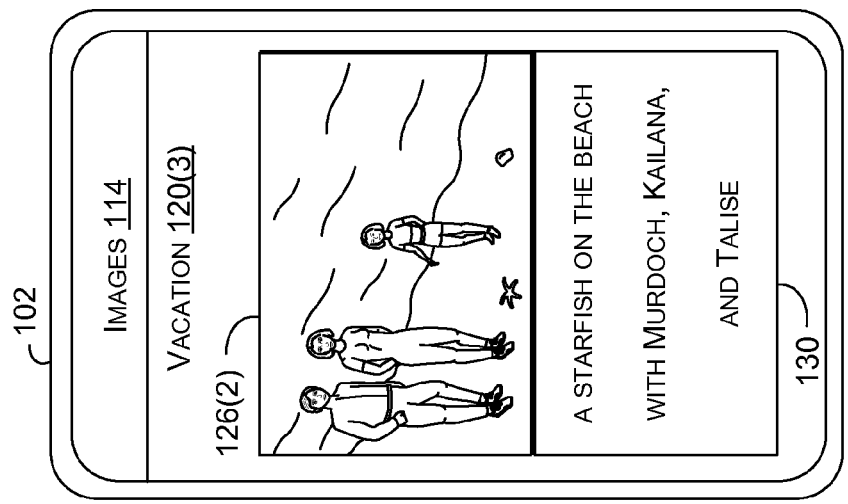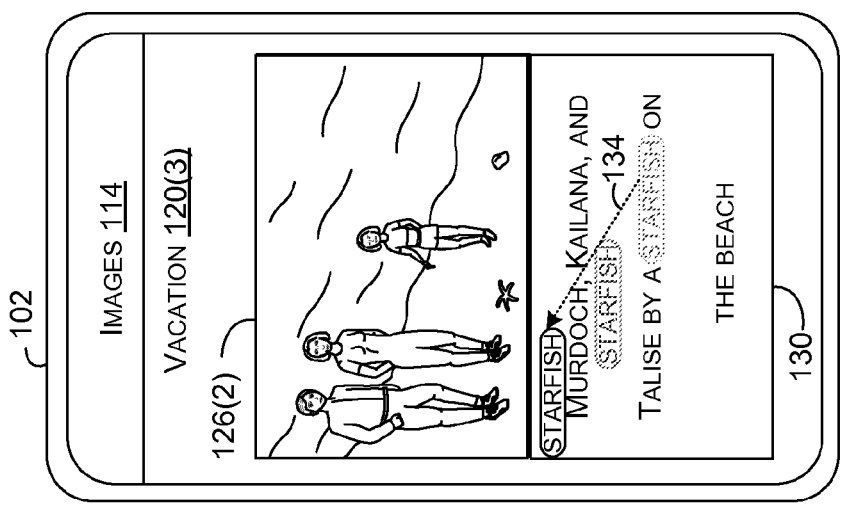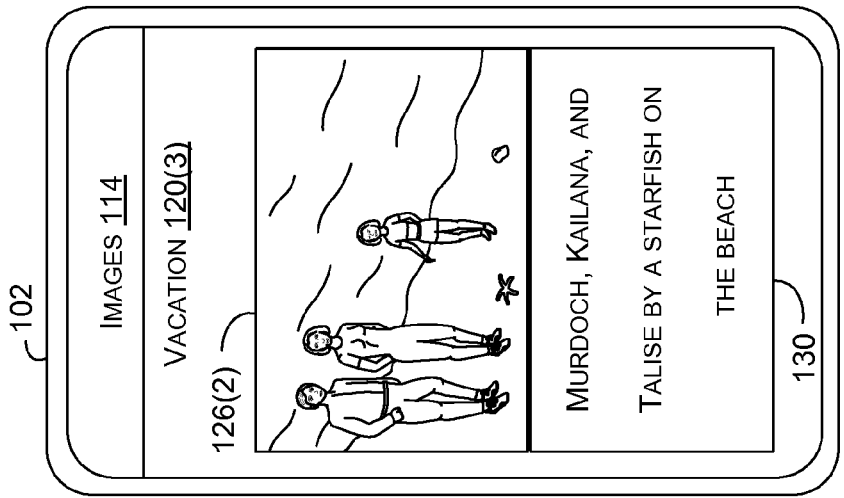

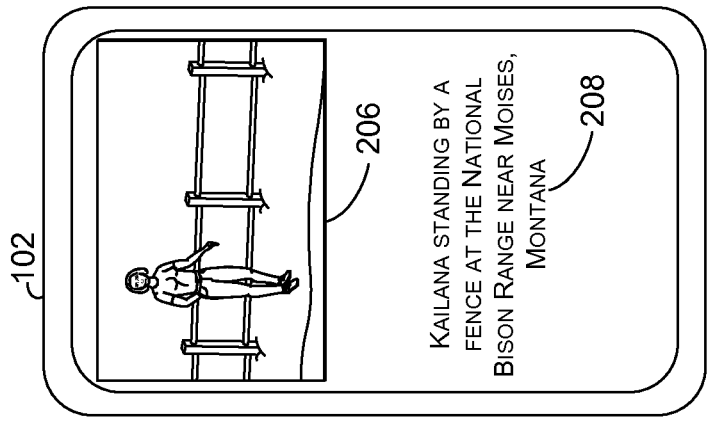
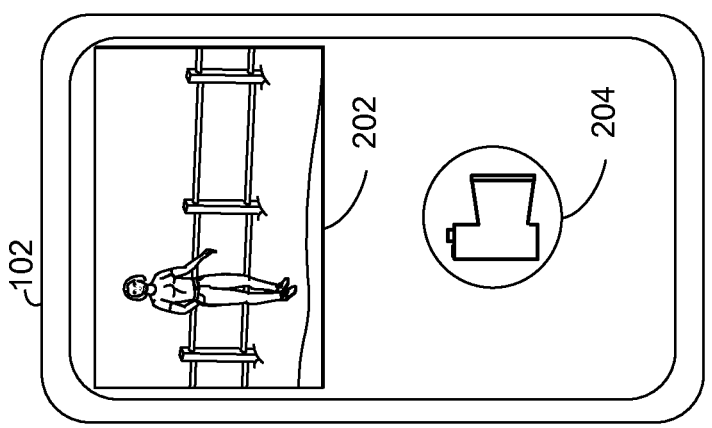
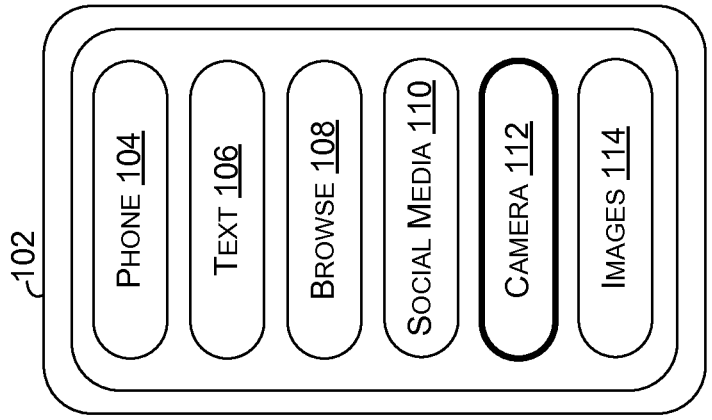
FIG. 2A

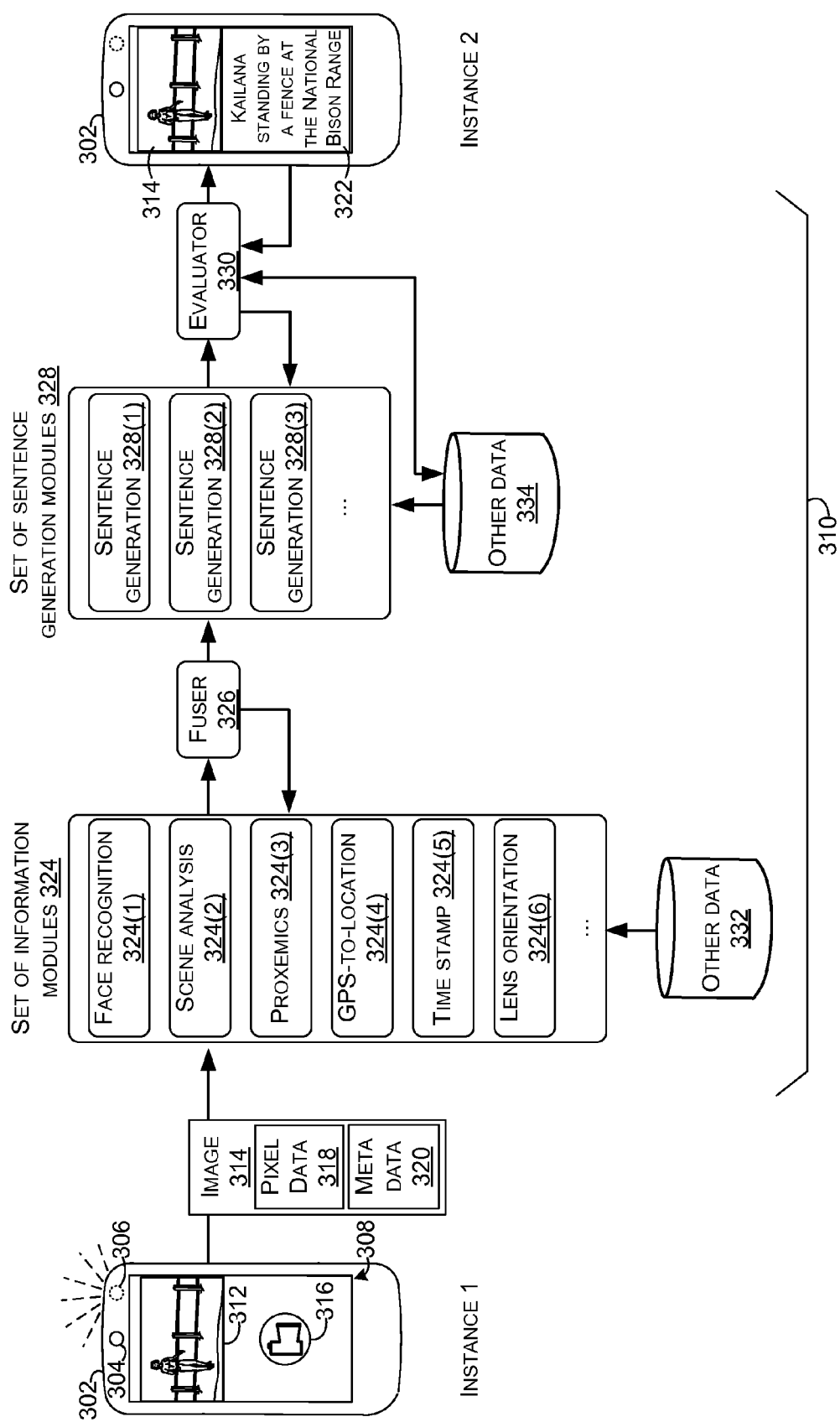

AUTOCAPTIONING OF IMAGES

BACKGROUND

Digital photography has greatly increased the number of pictures that people (i.e., users) take. Users also enjoy the digital platform so that they can download (and/or upload) their pictures to a social media site to share with other people. Having a description (e.g., a caption) of the pictures enhances the viewing experience for the people with whom the pictures are shared. However, manually creating the captions is so time consuming that users rarely take the time to do it. Thus, the people who view the shared pictures often have a less than satisfying viewing experience.

SUMMARY

The described implementations relate to autocaptioning sentences to images. One example can include an image sensor, a processor, and a display. The image sensor can be configured to capture an image manifest as image data or pixel data. The processor can be configured to associate metadata with the image. The processor can also generate a sentence caption from the image data and the metadata. The display can be configured to present the image and the associated sentence caption. As used herein, a "sentence" for captioning an image can mean a sentence fragment, a complete sentence, and/or multiple sentences.

Another example can include a set of information modules and a set of sentence generation modules. The set of information modules can include individual information modules configured to operate on an image or metadata associated with the image to produce image information. The set of sentence generation modules can include individual sentence generation modules configured to operate on the image information to produce a sentence caption for the image.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 1A-1C and 2A-2C illustrate a computing device upon which sentence autocaptioning of images can be accomplished in accordance with some implementations of the present concepts.

FIG. 3 illustrates an example of a computing device upon which sentence autocaptioning of images can be accomplished and FIG. 3 also shows a process for accomplishing sentence autocaptioning of images in accordance with some implementations of the present concepts.

DETAILED DESCRIPTION

Overview

Figure 2B:
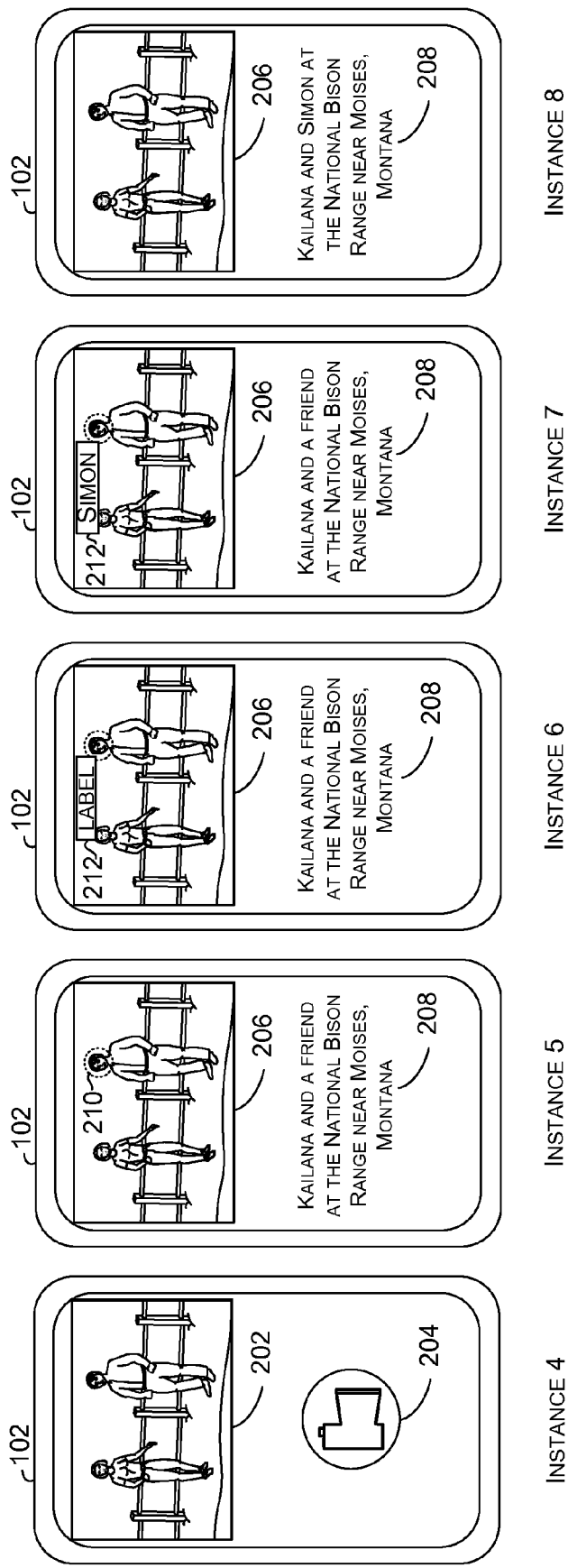

This patent relates to sentence autocaptioning of images. Pixel data and/or metadata of an image can be evaluated to obtain information about the image. This information can then be utilized to automatically generate a sentence autocaption for the image.

For purposes of explanation consider FIGS. 1A-1C which show a computing device 102 in several consecutive instances (e.g., FIG. 1A shows instances 1-4, FIG. 1B shows instances 5-7, and FIG. 10 shows instances 8-10). In this example, computing device 102 is manifest as a smart phone type mobile computing device that can provide multiple functionalities or features to the user. As illustrated in instance 1, the functionalities can include a phone functionality 104, a text message functionality 106, a web browsing functionality 108, a social media functionality 110, a camera functionality 112, and an images functionality 114. Assume for purposes of explanation that in instance 1, the user has selected the images functionality 114 as represented by bold highlight 116.

Instance 2 shows the computing device 102 responsive to the user selection related to instance 1. In this case, the computing device is now displaying options relating to the images functionality 114. For example, three folders or albums 120 (e.g., albums of images) are illustrated. The first album 120(1) is labeled "Christmas", the second album 120(2) is labeled "Spring break", and the third album 120(3) is labeled "Vacation". The computing device also shows an "autocaption" function 122 that is discussed relative to instance 3. Assume that at instance 2 the user wants to view the images (e.g., pictures) in the vacation album and as such selects the vacation album as indicated by bold highlight 124.

Instance 3 shows three images 126(1), 126(2), and 126(3) of the vacation album 120(3). Assume that the user selects image 126(2) as indicated by the bold highlight of that element. Further, assume that the user wants a sentence caption to be automatically generated for the image and as such selects the "autocaption" function 122 as indicated by the bold highlight of that element.

Instance 4 is generated responsively to the user selections at instance 3. At 130, this example shows image 126(2) with an automatically generated sentence caption "Murdoch, Kailana, and Talise enjoying the beach in Poipu, Kauai." Thus, sentence captions can be autogenerated for the user's photos with little or no effort from the user.

FIG. 1B starts with instance 5 which is an alternative configuration to instance 4 of FIG. 1A. In this case, the user is also offered the choice to cause another sentence autocaption to be generated, such as for a case where the user does not like the generated sentence. In this example, the user choice is manifest as a 'try again' icon 132. Assume that the user selected the 'try again' icon 132 as indicated by the bold highlight of that element.

Instance 6 shows another autogenerated sentence caption "Murdock, Kailana, and Talise walking along the surf in Poiou, Kauai." at 130. The user can either select this sentence (e.g., associate the sentence as an autocaption) or cause another sentence to be generated via icon 132.

Instance 7 shows still another variation where multiple automatically generated sentences are presented for the user. The user can then select one of the sentences for autocaptioning of the image 126(2). In this example, two sentences are presented to the user at 130. The first sentence reads "Murdoch, Kailana, and Talise enjoying the beach in Poipu, Kauai." The second sentence reads "Murdoch, Kailana, and Talise by a starfish." The user can select either of the sentences. Alternatively, though not shown the user could be offered the 'try again' icon mentioned above to view other sentences.

FIG. 1C shows additional features of some implementations. Instance 8 is similar to instance 5 of FIG. 1B where the user selects image 126(2) and a sentence is automatically generated for the image at 130. In this case, the sentence reads "Murdoch, Kailana, and Talise by a starfish on the beach." Instance 9 shows the user editing the sentence. In this case, the user is re-ordering the sentence by selecting and dragging (e.g., drag-and-drop) the word "starfish" to the beginning of the sentence as indicated by arrow 134. Instance 10 shows the result where the user editing is utilized as feedback and a new sentence is generated that reflects the user feedback. In this case, the updated sentence reads "A starfish on the beach with Murdoch, Kailana, and Talise." Of course, other types of user edits are contemplated.

Figure 2C:
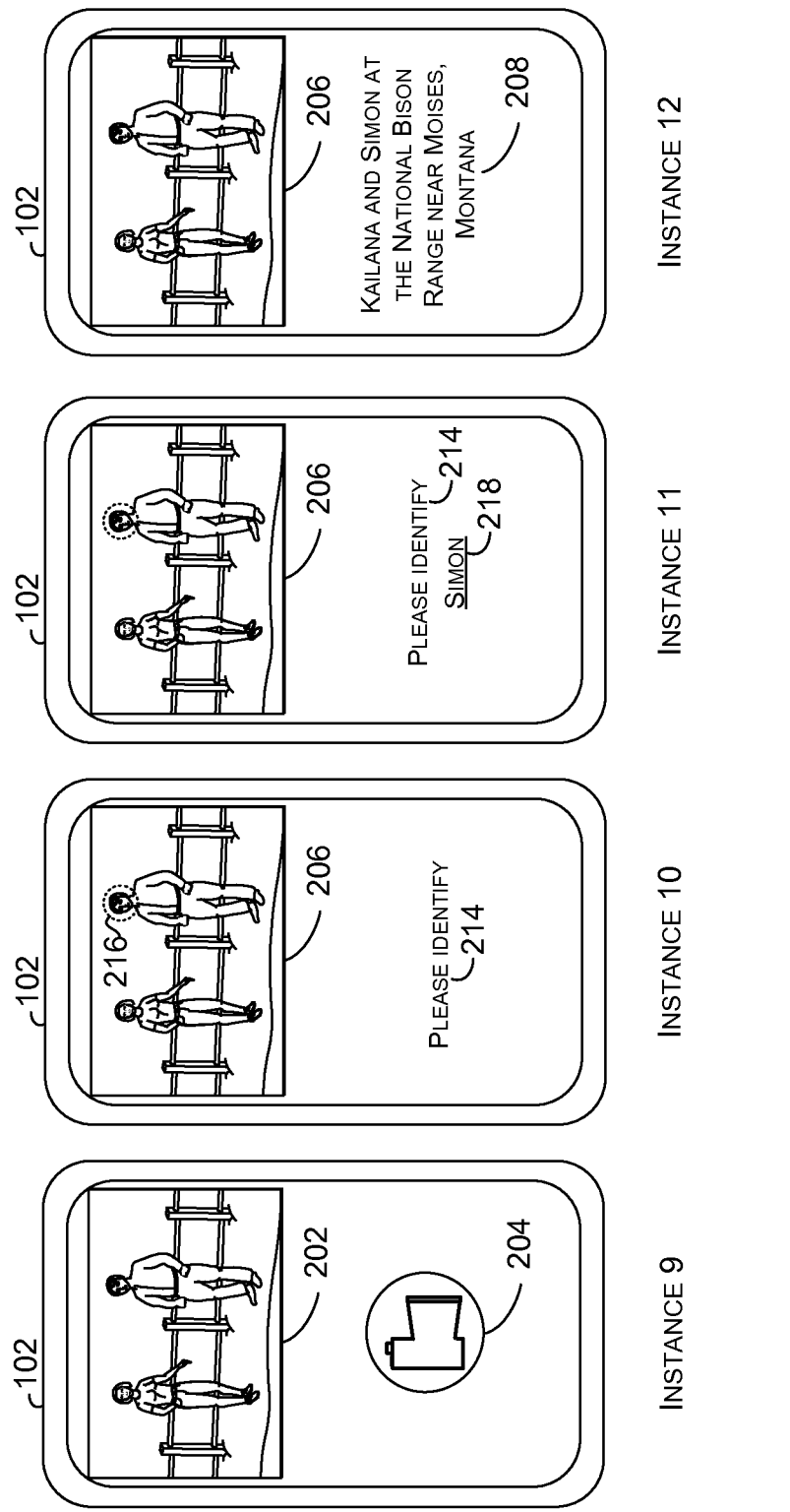

FIGS. 2A-2C collectively discuss autocaptioning features relative to a user taking a picture. These features can be interchangeable with the 'album' scenario described above relative to FIGS. 1A-1C and vice versa.

FIG. 2A begins with instance 1 which is similar to instance 1 of FIG. 1A except that the user has selected to use the camera functionality 112 to take a picture as indicated by the bold highlight of that element. Instance 2 shows an image preview 202. The user can take the picture by selecting the camera icon 204.

Instance 3 shows the resultant image (e.g., picture) 206 and associated auto-generated sentence at 208. In this example, the sentence reads "Kailana standing by a fence at the National Bison Range near Moises, Mont."

Instance 4, of FIG. 2B, shows another image preview 202. Assume that the user presses the camera icon 204 to take the picture which is reflected in instance 5. Instance 5 shows a picture 206 and an autogenerated sentence at 208. In this example, the autogenerated sentence reads "Kailana and a friend at the National Bison Range near Moises, Mont." Assume that the user wants to identify the other person (e.g., the friend) and as such taps the face on the screen as indicated at 210.

Instance 6 is generated responsive to the user action of instance 5 where the user tapped a portion of the image (in this case corresponding to a person's face). A text box is shown at 212 into which the user can label the person. The user can enter text via a keyboard, a virtual keyboard, or other mechanism, such as by saying the person's name. Any type of autosuggest and/or autocomplete technology can be utilized to make entry easier for the user.

Instance 7 shows the user entry label of "Simon" now associated with the image. This information can be utilized to update the autogenerated sentence. Instance 8 shows the results where the updated autogenerated sentence indicated at 208 now reads "Kailana and Simon at the National Bison Range near Moises, Mont." This feature is not limited to the user labeling (e.g., tagging) faces. For instance, the user could label or tag a building as "my favorite restaurant" our "our beach house." The user could alternatively label the natural environment, such as "our secret beach."

FIG. 2C shows another variation. In this case, instance 9 shows the image preview and instance 10 shows the image 206. However, in instance 10 a request 214 is made to the user to identify the circled person 216. In instance 11, the user enters "Simon" at 218. This user-provided information can then be utilized to automatically generate sentence 208 which reads "Kailana and Simon at the National Bison Range near Moises, Mont." Thus, techniques are described to allow user labeling of pictures on their own initiative or when requested. This information can be utilized to enhance the quality of the autogenerated sentences, for that image and/or other images.

In the above discussion single sentences are automatically captioned to the image. However, other implementations can generate sentence fragments, single sentences, and/or multiple sentences for an image. In this case, multiple sentences means sentences which augment one another, such as sentences of a paragraph, rather than alternative sentences. For instance, in the example discussed relative to instance 12, the sentences might read "Kailana and Simon at the National Bison Range near Moises, Mont. They are standing near the fence that borders the Western edge of the Range."

An example process for automatically generating sentence captions (e.g., sentence autocaption) is explained below relative to FIG. 3. Note that the illustrated computing device configuration is provided for purposes of explanation and other configurations are contemplated that allow sentence autocaptions to be generated for images.

FIG. 3 shows another computing device 302. In this case, the computing device includes two cameras; a first camera 304 points toward the user (e.g., out of the drawing page) and a second camera 306 points away from the user (e.g., into the drawing page). The second camera is shown in dotted lines (e.g., ghost) since it would not actually be visible to the user from the front of the computing device 302. Computing device 302 also includes a touch sensitive screen or display 308.

For purposes of explanation, computing device 302 is shown at instance 1 and instance 2. Instance 1 and instance 2 are separated by process 310 which is described below.

Beginning with instance 1, assume that the user has selected the camera functionality associated with camera 306. As a result, an image preview 312 is presented on display 308 and that the user takes a picture or image 314 by selecting icon 316. The image 314 can include image or pixel data 318 and associated metadata 320. The metadata can convey GPS coordinates that the image was captured at, date and time of image capture, type of camera, and/or type of computing device, among other information. As seen in instance 2, process 310 can produce a sentence autocaption 322 that is associated with the image 314.

In this example, process 310 can be accomplished by a set of information modules 324, an information fuser (or "fuser") 326, a set of sentence generation modules 328, and a sentence evaluator 330. In this case, the set of information modules can include a face recognition module 324(1), a scene analysis module 324(2), a proxemics module 324(3), a GPS-to-location module 324(4), a time stamp module 324(5), and a lens orientation module 324(6), among others. Other information modules can alternatively or additionally be included. Further, multiple instances of a given module type can be employed. For example, two or more face recognition modules could be employed instead of just one.

In this case, the set of information modules 324 is shown in parallel receiving a single input (e.g., the image 314) and generating a single output (to fuser 226). However, such need not be the case. For example, individual information modules can receive the input and generate their own output. Further, the modules can be arranged in a serial fashion such that the output of one module can serve as input to another module. One configuration can be thought of as a pipeline configuration. In such a configuration, several information modules can be arranged in a manner such that the image and output from one module serve as input to another module to achieve results that the another module cannot obtain operating on the image alone. Further still, even in a parallel relationship, one module can utilize the output of another module. One such example is described below relative to the face recognition module 324(1), the scene analysis module 324(2) and the proxemics module 324(3).

Briefly, individual information modules 324 can process the image's pixel data 318 and/or metadata 320 and/or other data 332 to produce information that is potentially useful to the set of sentence generation modules 328. The other data 332 can include many different types of data. For instance, the other data 332 can include faces that were previously labeled by the user relative to this or other images. (Such an example is described above relative to the user labeling or tagging a face in the image). In another case, the other data 332 could include the time stamps of other images that are already associated with an autocaption sentence. For instance, if the present image was taken in close temporal relation to this one (e.g., less than a second apart) the same elements may be in both images. As such the already labeled elements of the earlier captioned image can be useful for analyzing the present image. This aspect can be especially valuable where the image is from a set of images captured in a camera "burst mode" or where the image is a video frame from a video. In summary, images can be related in various ways. For instance, the images can be related temporally, by location, by objects or people in the images, etc. The relation can be part of other data 332 and can be utilized to derive useful information about individual images.

In some cases, the facial recognition module 324(1) can operate cooperatively with a face detection module (not shown for sake of brevity). The face detection module can identify regions in the pixel data 318 that are likely to be human faces. The facial recognition module 324(1) can then further process these regions to attempt to identify the face. For example, the facial recognition module can analyze various parameters of the face and compare values of those parameters to parameter values of labeled faces from other data 332. In this case, the facial recognition module 324(1) can receive an indication that one face occurs in the image and identify the face as belonging to Kailana. This information can be the output from the face recognition module to the fuser 326.

The scene analysis module 324(2) can identify various features or elements of the image 314. In this case, the scene analysis module can identify the vertical and horizontal features of the fence and identify these features as a fence. The scene analysis module can also receive output from the face recognition module regarding the location and identity of a face. The scene analysis module can use this information to identify the location of Kailana's body on the image 314. This information can be output to the fuser 326.

In another implementation, the scene analysis module 324(2) can function to determine the scene or scenario of the image. For instance, the scene analysis module can determine whether the image was taken: (a) at the beach, (b) in a park, (c) in a garden, (d) while skiing, etc. In such a case, the emphasis of the scene analysis module can be to identify the scene or scenario, rather than identifying specific objects within the image.

The proxemics module 324(3) can serve to identify relative relationships between elements of the image 314. Often the proxemics module functions to determine the relationship between two humans, such as whether the humans are embracing, holding hands, shaking hands, etc. In this case, the proxemics module can receive input from the scene analysis module 324(2) regarding the location of Kailana and the location of the fence and determine their orientation. For instance, in this example Kailana is near the fence, but is not engaging the fence, such as jumping over the fence or sitting on the fence. The proxemics module 324(3) can output this information to the fuser 326.

The GPS-to-location module 324(4) can operate on the image's metadata 320 to convert GPS coordinates of the metadata into a textual location. In this case, the GPS-to-location module maps the GPS coordinates to the National Bison Range near Moises, Mont., and outputs this information to the fuser 326.

The time stamp module 324(5) can also operate on the metadata 320. The time stamp module can analyze the timestamp to determine useful information such as the month or season, the day, the day of the week, and/or the time of day. For example, it can be useful for sentence generation to know whether the picture was taken in the Spring, Summer, Fall, or Winter. Also, the fact that the picture was taken on a particular day, such as 4th of July or Christmas, can be useful for sentence generation. Further, the time of the day can be useful (e.g., whether the photo was taken in the morning or evening).

In this case, the time stamp module 324(5) can also compare the time stamp from the metadata to other time stamps in the other data 332 to determine if any other images were taken in close temporal relation to this image. If so, the time stamp module can provide information from the other images to the fuser 326 and/or to other information modules 324. For instance, if the computing device 302 took another picture a half second before this one that contained one face that was already identified as belonging to Kailana, this information can be utilized by the face recognition module to increase its confidence score that it has correctly identified the face in this image (e.g., image 314). This type of scenario is especially useful where the image is from a "burst mode" or where the image is part of a video stream.

The lens orientation module 324(6) can evaluate the metadata 320 to determine which camera took the image 314. For instance, in cases such as this one where the backwards facing camera 306 is used, then the person taking the picture (e.g., the user) is not likely to be in the image 314. In contrast, if the forward facing camera 304 is utilized, the user is likely taking a picture of themselves in front of an interesting scene. This information can be sent to the fuser 326 for utilization by the set of sentence generation modules 328. For example, the sentence "Kailana taking a picture of herself at the entrance to Yellowstone" may be more interesting than "Kailana at the entrance to Yellowstone." This aspect will be discussed in more detail below relative to the set of sentence generation modules 328.

Of course, the listed information modules of the set of information modules 324 are provided for purposes of explanation. Other examples of information modules that can be employed can include weather recognition modules, landmark recognition modules, celebrity recognition modules, animal recognition modules, facial expression modules (e.g. whether a person is smiling or frowning), activity recognition modules (e.g., "having dinner", "playing tennis", "skiing"), clothing recognition modules (e.g., wearing a red shirt) and/or car model recognition modules, among others. Further, the present concepts allow the set of information modules to be readily configurable to accept new and/or different information modules and/or for existing information modules to be removed, as desired.

The fuser 326 can receive the potentially useful information produced by the individual information modules of the set of information modules 324 about the image 314. The fuser 326 can process, evaluate, filter, and/or organize the information for receipt by the set of sentence generation modules 328. For instance, in an implementation employing two face recognition modules 324(1), the first module could identify a face in the image 314 as one person, whereas the second module can identify the same face as another person or determine that there is not a face in the image. In such a scenario, the fuser can determine what information to forward to the set of sentence generation modules 328. For example, the fuser could decide that one module is more reliable than the other and only pass on its (the more reliable module's) determination. In another case, the fuser could pass on both findings along with their relative probabilities to the set of sentence generation modules 328.

In still another example, the fuser 326 can receive potentially incompatible information from two different information modules. For instance, the GPS-to-location module 324(4) might indicate that the picture was taken in Denver, Colo. and the scene analysis module 324(2) might indicate that the picture was taken at the beach. In such a case, the fuser may weight the reliability of the information from the GPS-to-location module higher than the information from the scene analysis module since beaches tend to occur with less frequency in Colorado than in states that border an ocean. Further, the fuser may request the scene analysis module to repeat its analysis to determine if the image was mis-identified. For instance, maybe snow was mis-identified as sand, for example. If the fuser is confident in the information from both modules, the fuser can also provide this information in a manner that allows for the generation of a more accurate sentence. For instance, many people tend to associate the beach with the ocean. So in this case, a resultant sentence might be improved by saying " . . . on a South Platte River Beach near Denver, Colo."

In summary, the fuser 326 can function to provide a filtered set of germane and accurate information to the set of sentence generation modules 328 and thereby enhance the quality of the sentences produced by the set of sentence generation modules 328. Alternatively or additionally, this filtering can reduce the processing resources and/or time consumed by the set of sentence generation modules 328 to generate a sentence from the information. Note also, that the fuser may not operate only in a one-way relationship between the set of information modules 324 and the set of sentence generation modules 328. Instead, the fuser 326 can feed information back to the set of information modules 324 in an iterative fashion to allow the set of information modules 324 to increase the quality of (e.g., refine) information that they output. The fuser can also use this feedback information to improve its own performance. That said, some implementations can operate without a fuser 326 and instead image related information output by the set of information modules 324 can be input directly into the set of sentence generation modules 328.

The set of sentence generation modules 328 can receive the information from the set of information modules 324 directly or a sub-set from the fuser 326. In this case, the set of sentence generation modules is represented as sentence generation modules 328(1)-328(3) but any number of one or more sentence generation modules can be utilized in various implementations. The set of sentence generation modules 328 can utilize this information from the fuser 326, as well as information from other data 334 to generate sentence fragments (with or without punctuation) and/or sentences for the image 314. For example, the other data 334 can include a training corpus, previously generated auto-caption sentences, user feedback, user style preferences, etc.

The other data 334 can allow the set of sentence generation modules 328 to generate sentence captions that are objectively correct and configured to please the subjective preference of the user. In a relatively simple example, the other data 334 can help the sentence generation modules 328 to avoid generating repetitive sentences. For instance, assume that the user quickly takes two pictures of Murdoch at the beach. Relative to the first picture, the sentence generation modules may autogenerate the sentence "Murdoch at the beach." This sentence can be added to the other data 334 so that the sentence generation modules are less likely to generate the same sentence for the second picture. Instead the generated sentence for the second image might read "Murdoch at the edge of the ocean" or "Another shot of Murdoch at the beach." While all three of these sentences are objectively accurate, a second occurrence of the first sentence may be met with less enthusiasm from the user than the latter sentences.

In another example, the other data 334 may indicate that the user likes more specificity in the autogenerated sentence captions 322. For instance, in a previous session, assume that an autogenerated sentence caption read "John in the mountains" and that the user had edited the caption to read "John in the Rocky Mountains." This user feedback information contained in the other data 334 can be applied to the above example so that rather than autogenerating a sentence caption like "Murdoch at the beach" the sentence generation modules can autogenerate a sentence caption like "Murdoch at Poipu Beach." The individual sentence generation modules can generate sentences from the information obtained from the fuser 326 and the other data 334. These sentences can be processed by the evaluator 330.

In one implementation, individual sentence generation modules 328 can employ sentence templates to automatically generate the sentences for the images. One example of a template can be "[Person1] and [Person2] at the [Scene] in [City Location]." For example, assume that the face recognition module 324(1) finds Person1 =Kailana and Person2=Talise and scene analysis module 324(2) returns Beach and GPS-to-location module 324(4) returns "Poipu, Kauai." Then sentence generation module 328 can generate "Kailana and Talise at the beach in Poipu, Kauai." Some implementations can maintain a large number of templates, each covering a different subset of possible results of the sentence generation modules. The evaluator 330 and/or the sentence generation modules 328 can determine which of the templates are applicable and choose one (such as the one where the most blanks are filled in).

The evaluator 330 can evaluate the sentences obtained from the set of sentence generation modules 328 to select a sentence to autocaption with the image 314. The evaluator can utilize information from other data 334 in the selection process and/or direct user feedback. For instance, if the evaluator receives one sentence from each sentence generation module 328(1), 328(2), and 328(3) the evaluator can compare the sentences to one another relative to one or more parameters to rank the sentences. For instance, the parameters can relate to sentence style (e.g., writing style), sentence detail and/or repetitiveness, user preferences, and/or user feedback, among others.

In some cases, the choice made by the evaluator 330 can be weighted by the parameters such as user preferences and/or previously generated sentences. For instance, the user may indicate that he/she prefers one template style over another template style. In such a case, this user preference can be used as a factor in selecting or choosing from the available templates. Thus, the type of template favored by the user can be a positive parameter. Similarly, if one template has been chosen recently to generate a sentence, that template can be a negative parameter to reduce the chance that identical (or very similar sentences) are selected for related pictures (e.g., those pictures taken in temporal sequence or occurring in the same album, for example).

Template style (e.g., writing style) can be proactively user defined or inferred from user feedback. For example, when autocaptioning is first set-up or activated the user could be presented with a series of writing samples and the user can select his/her preferences as a guide for future autocaption sentence structure. In another example, the evaluator 330 may iteratively utilize user feedback of autocaptioned sentences to develop a sentence style for the user.

As mentioned above, sentence detail can relate to how much detail is included in a sentence and/or what the detail relates to. For example, the user may want geographic details included in the autocaption sentences (e.g., " . . . at the beach in Poipu, Kauai" rather than " . . . at the beach"). The detail may also relate to time, naming, etc. For instance, the user may prefer " . . . walk along the beach at sunrise" rather than " . . . walk along the beach." Similarly, the user may want full names rather than less formal names. For example, the user may prefer "John Smith walks on the beach" to "John walks on the beach" (or vice versa). The evaluator 330 can consider (and in some cases weight) these various parameters to rank the sentences obtained from the set of sentence generation modules 328. The evaluator can select the highest ranking sentence. Alternatively, the evaluator can compare the sentences to a threshold and present any sentences that satisfy the threshold to the user so that the user can make the final selection.

Stated another way, the evaluator 330 can select a single sentence or multiple sentences to autocaption (as indicated at 322) for the image 314. For instance, the evaluator 330 may initially select two sentences from the set of sentence generation modules 328 to autocaption the image. If the user selects one of the sentences, this direct user feedback can be utilized for selecting a sentence for autocaptioning subsequent images. Despite the potential advantages offered by the evaluator 330, some implementations, such as those employing a single sentence generation module in the set of sentence generation modules 328, can function without the evaluator.

Note that the process 310 can serve to accomplish the sentence autocaptioning functionality. The process 310 can occur completely on the computing device 302. In other implementations, some or all of the process can be performed external to the computing device, such as by server or cloud-based resources.

Note also that a potential advantage of the described configuration is the flexible or configurable nature of the set of information modules 324 and/or the set of sentence generation modules 328. In this configuration, new information modules can be added to the set of information modules 324 as they become available and/or when existing modules are improved (e.g., upgraded). Similarly, new sentence generation modules can be added to the set of sentence generation modules 328 as they become available and/or when existing modules are improved (e.g., upgraded). The additions and/or deletions to the modules can be accomplished in a seamless fashion that need not interfere with providing sentence autocaptioning of images to the user.

Note further, that while process 310 is explained relative to a single image, the process lends itself to use with sets of images. In one case, a set of images can be an album. The feedback mechanisms provided in process 310 can allow the images of an album to be labeled with autocaption sentences that are interesting to read, non-repetitive and contextually related. Stated another way, the autocaption sentences can be contextually related in such a way that taken as a whole, the autocaption sentences provide a narrative for the album. For instance, if the album relates to a vacation, the first image may be autocaptioned with a sentence like "Our vacation started early in the morning at the San Jose, Calif. Airport." The next autocaption sentence might state that "We landed in Kauai in the afternoon." The next autocaption sentence might read "On the beach at last." As such, the autocaption sentences can collectively convey the essence of the images of the album. Further the autocaption sentences can be utilized in various ways. For instance, the autocaption sentences can be read aloud by a text-to-audio component to aide a visually impaired user in appreciating the contents of the album.

Further still, concepts can be applied to a set of images taken in close temporal proximity to provide meaning to the set. For instance, a burst mode of images can be analyzed so that the autocaption sentences that are generated for individual images of the set provide a narrative to the set. For instance a set of images showing a baseball batter could be labeled as "John awaits the pitch," "John swings at the pitch," and "John strikes out." The same technique can be applied to video. For instance, one implementation could autogenerate a sentence caption for frames occurring every second and/or every time there is a scene change. These autogenerated sentence captions can describe the video as a whole. The autogenerated sentence captions can be utilized for various purposes. For instance the autogenerated sentence captions can be searched to find specific events in the video. For instance, if the user wants to view the portion of the video that was taken at the National Bison Range, the user can select to search the autocaption sentences for this phrase and the corresponding portions of the video can be displayed for the user.

In summary, the above described implementation can take an image and then run a number of different algorithms that analyze various aspects of the image (image content, EXIF (exchangable image file format) data, user metadata, etc.) and automatically generate a sentence caption for the image. From one perspective, the present concepts can leverage the relationships between images to generate accurate and pleasing autocaption sentences. For example, the images may share the relation of being in the same album or folder, taken together in a burst, taken on the same day, taken at the same location, contain the same faces, etc. to generate meaningful autocaptions from sets of modules. The modules included in the sets can be easily changed and/or updated to refine the results.

System Example

Figure 4:
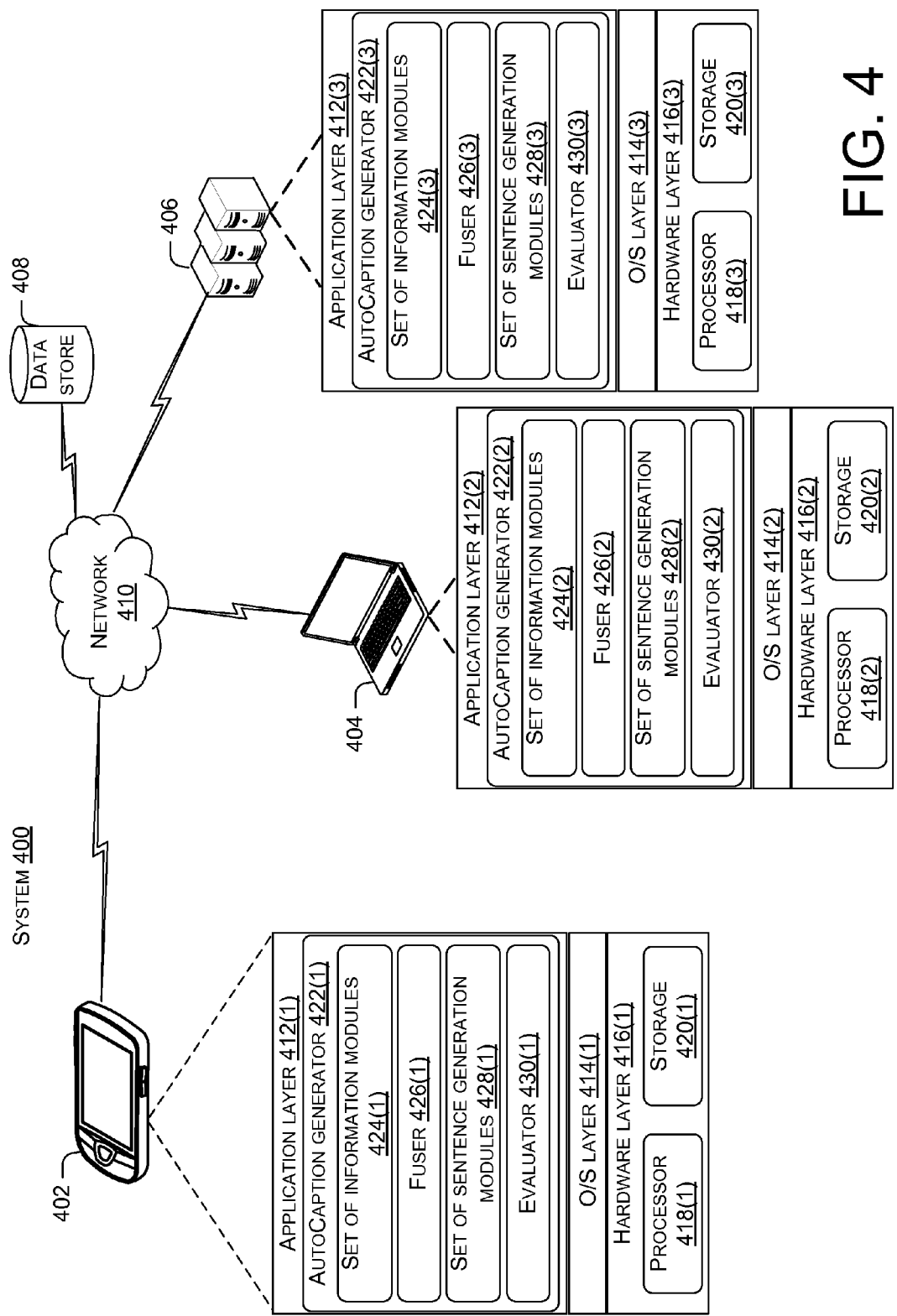
FIG. 4 illustrates a system which can accomplish sentence autocaptioning of images in accordance with some implementations of the present concepts.

FIG. 4 shows a system 400 configured to accomplish sentence autocaptioning of images. In this case, system 400 includes three computing devices 402, 404, and 406, as well as a data store 408. These components can be coupled via a network 410. For purposes of explanation, assume that computing device 402 (similar to computing device 102 of FIGS. 1A-1C, computing device 202 of FIGS. 2A-2C, and computing device 302 of FIG. 3) is a user's mobile device, such as a smart phone type device and that computing device 404 is the user's notebook computer. Also assume that computing device 406 is a remote computing device or devices that can provide computing resources. For instance, computing device 406 can be manifest as a server computer or as cloud-based computing resources.

Computing devices 402, 404, and 406 can include several elements which are defined below. For example, these computing devices can include an application layer 412 that operates upon an operating system layer 414 that operates upon a hardware layer 416. (In this case, the suffix "(1)" is used to indicate an instance of these elements on computing device 402, while the suffix "(2)" is used to indicate an instance on computing device 404 and the suffix "(3)" is used to indicate an instance on computing device 406. The use of these elements without a suffix is intended to be generic).

The hardware layer 416 can include a processor 418 and storage 420, as well as additional hardware components, such as input/output devices, buses, graphics cards, cameras, lenses, image sensors, etc., which are not illustrated or discussed here for sake of brevity.

The application layer 412 can include an autocaption generator 422. The autocaption generator 422 can include a set of information modules 424, a fuser 426, a set of sentence generation modules 428, and an evaluator 430. (These elements are similar to, or the same as, the like named elements introduced relative to FIG. 3).

The set of information modules 424 can include individual information modules configured to operate on an image and/or metadata associated with the image to produce image information. Information modules can be readily added to, or removed from, the set of information modules.

The set of sentence generation modules 428 can include individual sentence generation modules configured to operate on the image information to produce a sentence caption for the image. Sentence generation modules can be readily added to, or removed from, the set of information modules.

System 400 enables various implementations that can generate sentence captions for images based on the analysis of image content and related metadata. The autocaption generator 422 can allow users to capture images and display automatically generated captions for those images. These images and captions can then be shared via a number of social networking media, through the autocaption generator 422.

In one implementation, all three of computing devices 402, 404, and 406 can be configured to accomplish the sentence autocaptioning of image concepts described above and below. For example, computing device 402 can have a robust autocaption generator 422(1), such that computing device 402, operating in isolation, can accomplish sentence autocaptioning of images. Similarly, computing device 404 can have a robust autocaption generator 422(2), such that computing device 404, operating in isolation, can accomplish sentence autocaptioning of images.

In other implementations, the computing device 406 can have a relatively robust autocaption generator 422(3), while computing device 402 may include an autocaption generator 422(1) that offers more limited functionality for accomplishing the described concepts in cooperation with the computing device 406. In one such case, the autocaption generator 422(1) on computing device 402 can include a communication component (not shown). The communication component can be configured to obtain an image captured on the computing device 402, send the image to computing device 406 which can perform a majority of the data storage and processing. For example, the autocaption generator 422(3) of computing device 406 can generate the sentence autocaption for the image and return the sentence autocaption to computing device 402. The autocaption generator 422(1) of computing device 402 can associate the sentence autocaption with the image for presentation to the user and/or storage.

Other configurations can alternatively or additionally be employed. For example, computing device 406 alternatively or additionally to sending the sentence autocaption to computing device 402, could send the image and the autocaption to the user's notebook computing device 404 for storage and/or subsequent use by the user.

In still another configuration, computing device 406 may or may not return the autocaption to computing device 402, and can send the autocaption and the image to datastore 408. Datastore 408 can then act as a remote repository (e.g., cloud-based) of the user's autocaptioned images. Alternatively or additionally, datastore 408 could serve to store the other data (332 and/or 334 of FIG. 3).

Stated another way, the autocaption generators 422 of system 400 can allow users to capture images and upload to a backend system (e.g., computing device 406). The backend system can automatically generate corresponding sentence captions that can then be displayed within an application (e.g., the autocaption generator 422(1)) on computing device 402. The user can then upload the images and captions to a social networking site (e.g., social media functionality 110 of FIG. 1) or share the autocaptioned images via different media. Affordances, such as viewing upload history and the ability to easily edit the auto generated captions, can also be enabled within the autocaption generators 422.

The term "computer" or "computing device" as used herein can mean any type of device that has some amount of processing capability and/or storage capability. Processing capability can be provided by one or more processors (such as processor 418) that can execute data in the form of computer-readable instructions to provide a functionality. Data, such as computer-readable instructions, can be stored on storage, such as storage 420 that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In the illustrated implementation computing devices 402, 404, and 406 are configured with a general purpose processor 418 and storage 420. In some configurations, a computer can include a system on a chip (SOC) type design. In such a case, functionality provided by the computer can be integrated on a single SOC or multiple coupled SOCs. In one such example, the computer can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include the autocaption generator 422.

Shared resources can be storage, processing units, etc. that can be used by multiple functionalities. In this example, the shared resources can include the processor. In one case, as mentioned above autocaption generator 422 can be implemented as dedicated resources. In other configurations, this component can be implemented on the shared resources and/or the processor can be implemented on the dedicated resources. In some configurations, the autocaption generator 422 can be installed during manufacture of the computer or by an intermediary that prepares the computer for sale to the end user. In other instances, the end user may install the autocaption generator 422, such as in the form of a downloadable application.

Examples of computing devices can include traditional computing devices, such as personal computers, cell phones, smart phones, personal digital assistants, pad type computers, cameras, or any of a myriad of ever-evolving or yet to be developed types of computing devices. Further, aspects of system 400 can be manifest on a single computing device or distributed over multiple computing devices.

First Method Example

Figure 5:
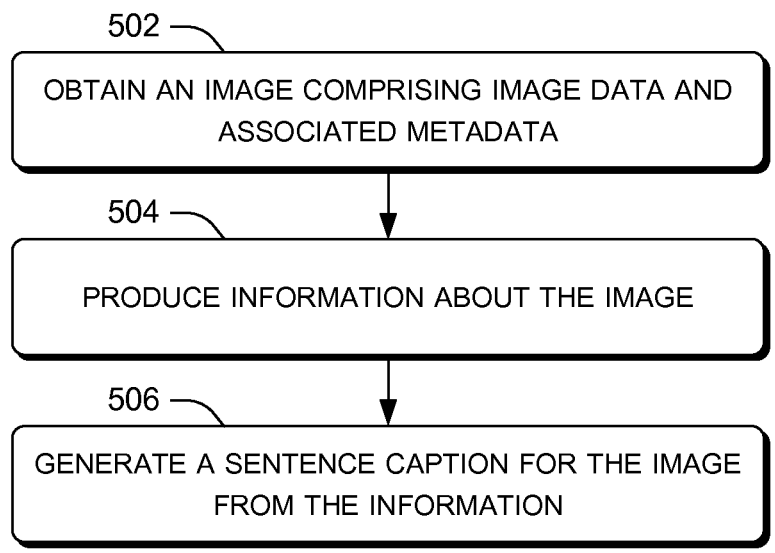
FIG. 5 is a flowchart of a sentence autocaptioning process that can be accomplished in accordance with some implementations of the present concepts.

FIG. 5 shows a flowchart of a sentence autocaptioning of images method or technique 500 that is consistent with at least some implementations of the present concepts.

At block 502 the method can obtain an image comprising image data and associated metadata.

At block 504 the method can produce information about the image.

At block 506 the method can generate a sentence caption for the image from the information.

Method 500 can be performed by the computing devices described above relative to FIGS. 1A-1C, 2A-2C, 3, and/or 4, and/or by other devices and/or systems. The order in which the method 500 is described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage media as a set of instructions such that execution by a computing device causes the computing device to perform the method.

Conclusion

Although techniques, methods, devices, systems, etc., pertaining to sentence autocaptioning of images are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
a set of information modules, individual information modules configured to operate on an image or metadata associated with the image, the set of information modules including:
a scene analysis module configured to identify a scenario of the image, the scenario involving a human and a non-human object, and
a proxemics module configured to receive the scenario identified by the scene analysis module and utilize the scenario to identify a relative relationship between the human and the non-human object; and,
a set of sentence generation modules, individual sentence generation modules configured to produce a sentence caption for the image that reflects the scenario identified by the scene analysis module and the relative relationship between the human and the non-human object identified by the proxemics module; and,
a processing device that executes computer-executable instructions associated with at least the set of sentence generation modules.

2. The system of claim 1, wherein the set of information modules further includes a face recognition module, a scene analysis module, a GPS-to-location module, and a time stamp module.

3. The system of claim 1, wherein the scenario identified by the scene analysis module includes locations of the human and the non-human object, and the proxemics module is further configured to:
determine orientations of the human and the non-human object based on the locations, the orientations comprising the relative relationship between the human and the non-human object.

4. The system of claim 1, wherein the image is a video frame from a video and wherein the set of sentence generation modules is configured to consider sentence captions generated for other video frames from the video to produce the sentence caption for the image.

5. The system of claim 1, further comprising an information fuser configured to:
receive image information from the individual information modules, the image information including the scenario and the relative relationship; and
evaluate the image information and provide the evaluated image information to the set of sentence generation modules.

6. The system of claim 1, further comprising an evaluator configured to receive a sentence from each of the individual sentence generation modules and to select the sentence caption for the image from the received sentences based upon context provided by related images.

7. The system of claim 6, wherein the evaluator is further configured to receive a sentence caption selection from a user, and to use a template of the sentence caption selection as a negative parameter to influence selection of subsequent templates.

8. A computer-readable storage media having instructions stored thereon that when executed by a computing device cause the computing device to perform acts, comprising:
obtaining an image comprising image data and associated metadata;
producing information about the image using the image data and the associated metadata;
receive a label from a user, the label corresponding to an individual non-human element that is visible in the image;
automatically generating multiple sentence captions or sentence fragment captions for the image from the information and the label of the corresponding individual non-human element in the image;
presenting a display of the multiple sentence captions or the sentence fragment captions for the user; and,
utilizing a user selection of an individual sentence caption or sentence fragment caption to automatically generate a subsequent sentence caption for a subsequent image.

9. The computer-readable storage media of claim 8, wherein the obtaining comprises capturing the image or where the obtaining comprises obtaining the image from a device that captured the image.

10. The computer-readable storage media of claim 9, wherein the device comprises the computing device.

11. The computer-readable storage media of claim 8, wherein the producing comprises evaluating pixel data of the image, metadata related to the image, and other data, and wherein the other data relates to other elements manually labeled by the user in other images.

12. The computer-readable storage media of claim 8, wherein the image comprises a video frame and wherein the information conveys a temporal relationship of the video frame to other video frames.

13. The computer-readable storage media of claim 8, wherein the device is not the computing device.

14. A computing device, comprising:
- an image sensor configured to capture an image comprising image data;
- a processor configured to associate metadata with the image;
- an information fuser configured to:
  - determine weighted reliabilities of portions of the metadata, the weighted reliabilities being particular to the image, and
  - filter the metadata for the image based on the weighted reliabilities that are particular to the image;
- a set of sentence generation modules configured to generate sentences for the image from at least some of the image data and the filtered metadata;
- an evaluator configured to evaluate the sentences generated by the set of sentence generation modules and to select an individual sentence as a sentence caption for the image; and,
- a display configured to present the image and the sentence caption.

15. The computing device of claim 14, further comprising a set of information modules configured to provide the metadata to the information fuser, wherein the weighted reliabilities are associated with individual information modules that provide the corresponding portions of the metadata.

16. The computing device of claim 14, wherein the evaluator is configured to select the individual sentence based on sentence styles of the sentences.

17. The computing device of claim 14, wherein the evaluator is configured to select the individual sentence by comparing the sentences to a threshold.

18. The computing device of claim 14, wherein the evaluator is further configured to provide feedback to the set of sentence generation modules regarding the selected individual sentence.

19. The computing device of claim 14, further comprising an individual sentence generation module configured to generate at least one of the sentences based upon user defined preference and user feedback.

20. The computing device of claim 14, wherein the evaluator is configured to select the individual sentence based on previously selected sentence captions.

* * * * *